July 6, 1965　　　C. A. HARRIS　　　3,193,712
HIGH VOLTAGE CABLE
Filed March 21, 1962
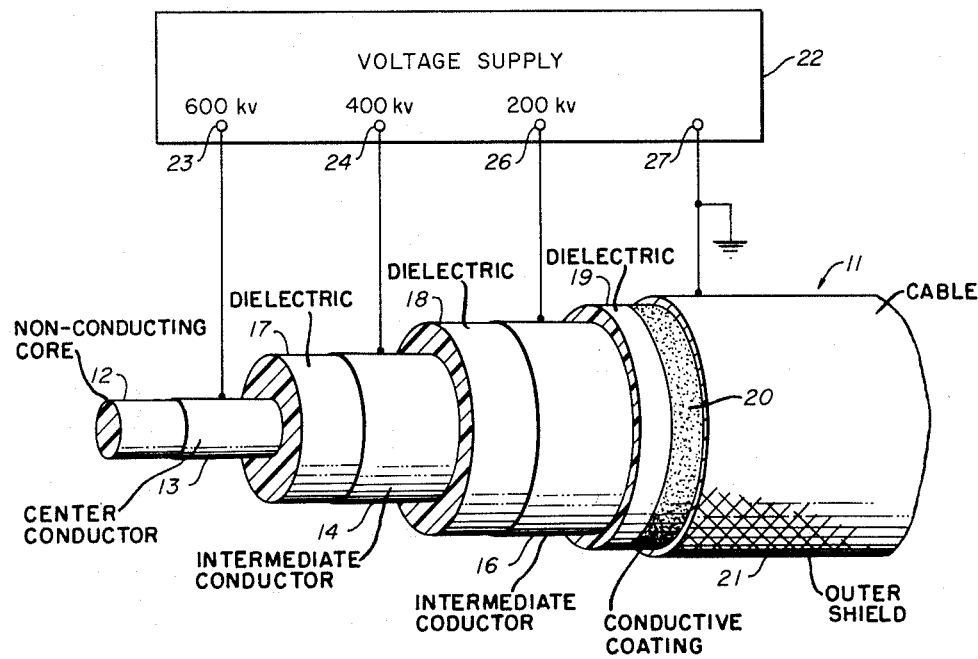
INVENTOR.
CLARENCE A. HARRIS
BY
ATTORNEY.

United States Patent Office 3,193,712
Patented July 6, 1965

3,193,712
HIGH VOLTAGE CABLE
Clarence A. Harris, Berkeley, Calif., assignor to the United States of America as represented by the United States Atomic Energy Commission
Filed Mar. 21, 1962, Ser. No. 181,493
2 Claims. (Cl. 307—147)

The present invention relates to direct current high voltage apparatus and more particularly to an improved coaxial cable for the transmission of high voltage direct current.

In connecting certain types of electrical equipment with a high voltage supply problems may be encountered which are not readily met by conventional forms of conductor. A charged particle spectrometer of the class having crossed electric and magnetic fields, for example, constitutes a high voltage low current consuming load, using potentials in the order of 500,000 to 1,000,000 volts at only a few milliamps current, which load is inherently subject to intermittent sparking. For such applications, it is necessary to have an equally high voltage capacity cable and it is particularly desirable that the cable have a very low effective capacitance in order that the energy stored therein will not be delivered to the load during a spark.

In addition, spatial considerations may require that the cable have a very small bending radius, for example a radius of less than three feet. The amount of insulation normally required in a cable for the specified voltage range results in such a large cable diameter as to preclude a bending radius this small. Furthermore, since the weight of a cable increases with the square of the cable diameter, long conventional cable sections are unwieldy and difficult to handle. Thus it is generally desirable, and sometimes necessary, that the diameter of the cable be as small as possible.

It is commonly a further general requirement of high voltage cables that there be a grounded shield around the outer surface of the cable, for the protection of personnel and for preventing the radiation of electromagnetic impulses from the cable. Such impulses may occur when there is a sudden surge of current through the cable as is caused by arcing in the load and such radiation is particularly undesirable as it easily induces electrical interference in nearby electronic circuitry.

The present invention is a novel high voltage cable initially developed to meet the above discussed requirements at a particle spectrometer and which has considerable advantages in many other common uses of high voltage transmission lines. In particular, the invention is a coaxial cable which may have a diameter as low as one half of that of a conventional cable of comparable voltage holding capacity. In addition the invention acts in a novel manner to suppress arcing in an associated load.

Although one of the usual objectives in designing any cable of this type is to reduce the cable diameter and to minimize the cable weight as much as possible, for a given insulation material used in the cable and a given voltage rating, the distance between the center high voltage conductor and the outer grounded shield cannot be reduced below the point where the direct current voltage gradient exceeds the dielectric strength of the insulation between the center conductor and the shield. The voltage gradient varies radially in the cable according to the expression:

$$e_g = \frac{V}{(r) \ln \frac{b}{a}}$$

where $e_g$ is the voltage gradient, $r$ is the distance from the axis of the cable to the point at which $e_g$ applies, $a$ is the radius of the center conductor, $b$ is the radius of the outer shield, and $V$ is the voltage between the center conductor and the shield.

As is evident from the foregoing equation, the voltage gradient $e_g$ decreases logarithmically along a radius of a conventional cable. Thus when the rated voltage is applied to the cable, only the dielectric nearest the center conductor is being used at the rated capacity of the material while the remainder of the insulation is operating at much below its breakdown potential. Thus if the outer portion of the dielectric may be made to function nearer to its rated capacity without exceeding the dielectric strength of the inner portion, the diameter of the cable may be considerably reduced.

In the present invention, one or more coaxial intermediate conductors have been included in the cable, spaced between the center conductor and the outer shield whereby the dielectric insulation is divided into coaxial annular segments. Each intermediate conductor has applied thereto a separate intermediate potential, the successive values of which decrease radially outward in the cable from that of the center conductor to the ground potential of the outer shield. The potentials on the intermediate coaxial conductors are fixed at values greater than those normally present at corresponding radial points in a conventional two conductor coaxial cable so that, in effect, the voltage gradient near the center conductor is reduced while the gradient near the outer shield is increased.

In this way the absolute radial voltage difference across each dielectric segment is only a fraction of the voltage on the cable and the voltage gradients associated therewith are mutually independent. Although the voltage gradient continues to vary across each segment, the extent of the variation between the maximum gradient and minimum gradient present in each segment is greatly reduced over the range existing in a comparable two-conductor cable. Thus, all of the dielectric material in the cable is used more uniformly and at nearer its rated capacity. By using the dielectric more efficiently, less of the material is needed and the outside diameter of the cable can be considerably reduced without lessening the amount of voltage which can be safely carried by the cable.

To inhibit the damaging effects of arcing in the load, the central and intermediate conductors are made of a moderately resistive material. Thus if an arc appears in the load, the distributed resistance of the transmission line causes a sufficient voltage drop to immediately suppress and extinguish the arc. The distributed nature of the resistive conductor decreases the effective capacitance of the cable by reducing the available energy stored in the line so that possible arc damage is minimized.

It is accordingly an object of the present invention to provide a new and improved direct current high voltage cable.

It is another object of this invention to provide a means for more efficient utilization of the dielectric insulation of a high voltage transmission cable.

It is another object of this invention to provide a transmission cable having a smaller cable diameter for a given voltage carrying capacity than has heretofore been the practice.

It is a further object of this invention to provide a transmission cable which inherently suppresses arcs in an associated load without requiring a lumped series resistor in the circuit.

It is still another object of this invention to reduce the weight and increase the flexibility of high voltage cables by providing a means for reducing the diameter of the cable below that of a conventional cable of similar voltage carrying capacity.

The invention, both as to its organization and method of operation, together with further objects and advantages thereof, will best be understood by reference to the accompanying drawing which is a broken out perspective view showing a portion of a high voltage carrying coaxial cable and associated potential source.

Referring now to the drawing there is shown a cable 11 having a central axially directed core 12. The core 12 is preferably made of a strong supple substance having no electrical conducting properties; a synthetic fiber such as nylon for example, and is included in the cable 11 to provide tensile and torsional strength during the succeeding operations of the cable manufacture and for the extended life of the cable in use. All of the other components of the cable 11 are disposed coaxially about the center core 12.

A cylindrical conductor 13 is disposed coaxially on the core 12 and is made of extruded polyethylene, polyvinyl chloride or similar material typically having a resistance of 25,000 ohms per foot. This resistance value is selected with respect to the desired voltage capacity of the cable in conjunction with considerations of vacuum sparking in low impedance systems wherein it is generally known that the highest value at which the sparking current will cut-off is approximately one-half an ampere. Therefore, in order to inhibit spark regeneration, it is necessary to maintain a current level below this critical value. Thus for the 600 kilovolt capacity of the present cable and for the commonly considered minimum practical cable length of fifty feet, this lineal resistance will sufficiently limit the current. It can be seen, however, that the resistance value may depart considerably from this figure for similar suitable conductor materials and various desired voltage capacities.

In the present embodiment of the invention, two cylindrical intermediate conductors 14 and 16 are used. The intermediate conductors 14 and 16 may be made from the same somewhat resistive material as center conductor 13 and are disposed coaxially therewith, conductor 14 being innermost. Innerspacing the three coaxial conductors 13, 14 and 16 are first and second annular layers of dielectric insulation 17 and 18, respectively, while a third dielectric layer 19 surrounds the outer conductor 16; the succession of alternate conductors and dielectric layers being in contact along the facing surfaces thereof. The three dielectric layers 17, 18 and 19 are of progressively decreased radial thickness as will hereinafter be more fully described. A low resistance cylindrical ground shield 21 is disposed around the outside of the third dielectric layer 19 for the previously mentioned purposes of providing for personnel safety and reducing of electrical interference due to the cable. Preferably, a conductive coating 20 is included between the outer dielectric layer 19 and the ground shield 21 to prevent local high voltage gradients from developing, such coating being particularly desirable if the ground shield 21 is of the usual stranded copper basketweave type.

The conductors of the cable 11 are each connected to separate terminals on a high voltage supply 22. While the particular voltage levels indicated in the drawing are those used with a present embodiment of the invention, they are shown to exemplify typical relative values between conductors, and it should be understood that, within limits, other values are possible and are within the scope of the invention. The center conductor 13 is in this instance connected to a 600 kilovolt terminal 23 on supply 22 and intermediate conductors 14 and 16 are connected respectively to a 400 kilovolt terminal 24 and a 200 kilovolt terminal 26 thereon. The outer ground shield 21 is connected to a ground terminal 27 on the voltage supply 22. With the total 600 kilovolts applied across the cable 11 in this way, the voltage difference between any two consecutive conductors is consistently 200 kilovolts thereby equalizing the voltage drop across each dielectric layer of the cable.

The radial spacing of the conductors and the relative values of the voltages applied thereto may be theoretically determined from the aforementioned equation for the voltage gradient:

$$e_g = \frac{V}{(r) \ln \frac{b}{a}}$$

By solving the derivative of this equation for the optimum condition of minimum cable thickness, one finds the condition satisfied when the radii of successive conductors in the cable increase in the ratio of $e$, the Naperian constant, in which case the voltage differences across successively outward conductors must bear the same relationship. While this combination produces the smallest diameter cable, as a practical matter it also increases the complications resulting from possible arcing across conductors in the cable, particularly since this arcing is most likely to occur in the outer regions of the cable. It can be seen that by distributing the voltages in increasing amounts outwardly in the cable the sum of the higher voltage across the outer conductors being shorted in the case of an arc will appear across the inner conductors and greatly exceed the voltage capacities of the intervening dielectric. Such high overloading may then easily destroy the dielectric in these inner regions. By modifying the cable design criteria with respect to the voltage differences to prevent such overloading, there results only a small percentage increase in the overall thickness of the cable. Thus, for practical purposes, the voltage differences between successive conductors are considered a more independent parameter of design with the radial spacing of the conductors to be dependent thereon.

It will be apparent that some degree of reduction in the overall cable diameter can be made under the condition that the voltage ($Vr$) applied to an intermediate conductor be just larger than that amount which would be present owing to the voltage gradient existing at the corresponding radial distance $r$ in a comparable two-conductor cable. Shown mathematically, from the above equation, some cable diameter reduction may be made when $$V > V_r > \frac{\ln \frac{b}{r}}{\ln \frac{b}{a}} V$$

Given specific voltages for the intermediate conductors as determined by the considerations discussed above, the minimum radial spacings between neighboring ones of the conductors may be determined from the hereinbefore given equation by considering each such pair of conductors as a two conductor cable and fixing $e_g$, the voltage gradient, according to the dielectric strength of the particular insulation employed between the conductors. When determined in this manner, the ratio of the spacing of neighboring conductors to the potential difference therebetween becomes progressively smaller outwardly along a radius of the cable. In the present embodiment of the invention the voltages are selected in equal 200 kilovolt intervals to adapt the system to the potentials provided by typical available voltage supplies. In view of the equal voltage differences between the successive conductors in this embodiment the radial spacing between conductors is progressively decreased radially outward in the cable. These conditions result in an increase in the overall cable diameter of little more than one percent over that of the theoretical optimum design, while the cable is still approximately only half the size of an ordinary cable of equal voltage capacity.

In the ordinary two conductor coaxial cable the greatest portion of the total voltage drop is concentrated in the inner region of the dielectric with the smaller, more gradual drop across the greater outer region. In the present invention the total voltage differential is divided among the several conductors 13, 14, 16 and 21 thereby equalizing the voltage drop across each dielectric layer 17, 18 and 19 of the cable. While the voltage gradient varies in essentially the same way within each dielectric layer, the ratio between the highest and lowest gradients present at different radii in the cable is greatly reduced. Thus the average voltage gradient across the cable is substantially increased without having the highest gradient value exceed the dielectric breakdown level and, consequently, the radial thickness of dielectric material required is substantially reduced. The cable diameter of the present invention is roughly one-half that of a comparable conventional cable. The smaller cable is much more convenient to work with because of its lighter weight and smaller bending radius.

The present cable was designed for use with loads wherein generally the object is to provide a very intense electric field, as in a charged particle spectrometer. In such usage the intermediate potentials on the intermediate shields are connected to voltage gradient rings in the spectrometer to inhibit arcing. As previously mentioned the conductors are made of a resistive plastic material, whereby, should an arc occur in the load, the resistivity of the conductors limits the amount of energy available to the arc. This kind of distributed resistance is much preferable to the conventional lumped resistance in that the distributed capacity between conductors cannot accumulate to form the equivalent of one or more large capacitors. In high voltage systems it is dangerous to permit large capacitances to form, for in the event of an arc very large quantities of energy can be released. The resistive conductors of the present invention avoid this condition by acting to isolate the distributed capacitance elsewhere along the cable. In addition, with a conventional lumped resistance, an arc in the load causes a very high voltage gradient to appear across the resistance and further arching may occur in the immediate vicinity thereof. When an arc occurs with the present invention, the lineal voltage gradient is much lower since the resistance is distributed over the length of the cable.

It should be understood that the invention is not limited to the precise construction herein described. For example, the number of intermediate conductors and intervening dielectric layers may be varied according to the degree of reduction of cable diameter which is required. In general, the cable diameter may be increasingly reduced as the number of intermediate conductors is increased although the reduction is proportionately less for each added intermediate conductor.

Thus while the invention has been described with respect to a particular embodiment thereof, it will be apparent to those skilled in the art that numerous variations and modifications are possible within the spirit and scope of the invention and thus it is not intended to limit the invention except as defined in the following claims.

What is claimed is:

1. In a coaxial cable for the transmission of direct current from a high voltage source, the combination comprising a center conductor, at least one annular intermediate conductor disposed coaxially around said center conductor and insulated therefrom, an outer conductor disposed coaxially around said intermediate conductor and insulated therefrom, the insulating layers being of like material, the ratio of the spacings between neighboring ones of said conductors to the voltage differences therebetween being progressively less outwardly along a radius of said cable, means coupling said voltage source across said center and outer conductors, and means applying a direct current potential to said intermediate conductor which potential is determined by the relationship:

$$V > V_r > \frac{\ln \frac{b}{r}}{\ln \frac{b}{a}} V$$

where:
$V_r$=the potential applied to said intermediate conductor,
$r$=the radius of said intermediate conductor,
$b$=the radius of said outer conductor,
$a$=the radius of said inner conductor,
and
$V$=the potential on said inner conductor relative to that on said outer conductor.

2. Apparatus for the transmission of high direct current voltages comprising, in combination, a center core composed of a flexible non-conductive material, an inner annular conductor disposed immediately upon said core and being formed of moderately resistive material, a first intermediate conductor disposed coaxially around said inner conductor and electrically insulated therefrom, said first intermediate conductor being formed of moderately resistive material, a second intermediate conductor formed of moderately resistive material and being disposed coaxially around said first intermediate conductor and electrically insulated therefrom, an outer conductor disposed coaxially around said second intermediate conductor and electrically insulated therefrom, the insulating layers being of like material, and a direct current voltage source having a plurality of differing voltage potential taps including a high potential tap connected to said inner conductor, a ground potential tap connected to said outer conductor, and a first intermediate potential tap connected to said first intermediate conductor and a second intermediate potential tap having a value lower than said first intermediate potential connected to said second intermediate conductor, the values of said first and second intermediate potentials being determined by the relationship:

$$V > V_r > \frac{\ln \frac{b}{r}}{\ln \frac{b}{a}} V$$

where:
$V_r$=the potential applied to said intermediate conductor,
$r$=the radius of said intermediate conductor,
$a$=the radius of said inner conductor,
$b$=the radius of said outer conductor,
and
$V$=the voltage of said high potential tap
the ratio of the spacings between neighboring ones of said conductors to the voltage differences therebetween being progressively less outwardly along a radius of said conductors.

References Cited by the Examiner

UNITED STATES PATENTS

| | | | |
|---|---|---|---|
| 1,039,298 | 9/12 | Kurda | 317—70 X |
| 2,377,153 | 5/45 | Hunter et al. | 174—107 X |
| 2,622,152 | 12/52 | Rosch | 174—102 |

FOREIGN PATENTS

| | | |
|---|---|---|
| 21,860 | 1907 | Great Britain. |
| 272,407 | 6/27 | Great Britain. |
| 512,798 | 2/55 | Italy. |

JOHN F. BURNS, *Primary Examiner.*

JOHN P. WILDMAN, LARAMIE E. ASKIN,
*Examiners.*